(12) United States Patent
Wang et al.

(10) Patent No.: US 11,409,839 B2
(45) Date of Patent: Aug. 9, 2022

(54) PROGRAMMABLE AND HIERARCHICAL CONTROL OF EXECUTION OF GEMM OPERATION ON ACCELERATOR

(71) Applicant: ALIBABA GROUP HOLDING LIMITED, Grand Cayman (KY)

(72) Inventors: Yuhao Wang, San Mateo, CA (US); Fei Sun, San Mateo, CA (US); Fei Xue, San Mateo, CA (US); Yen-Kuang Chen, San Mateo, CA (US); Hongzhong Zheng, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 172 days.

(21) Appl. No.: 17/000,200

(22) Filed: Aug. 21, 2020

(65) Prior Publication Data
US 2022/0058237 A1   Feb. 24, 2022

(51) Int. Cl.
  *G06F 17/16*   (2006.01)
  *G06N 3/08*   (2006.01)
(52) U.S. Cl.
  CPC ............... *G06F 17/16* (2013.01); *G06N 3/08* (2013.01)
(58) Field of Classification Search
  CPC ........................................... G06N 3/08

USPC ....................................................... 708/607
See application file for complete search history.

(56) References Cited

U.S. PATENT DOCUMENTS

| | | | |
|---|---|---|---|
| 11,237,880 B1 * | 2/2022 | Raumann | G06F 9/45558 |
| 11,281,967 B1 * | 3/2022 | Volpe | G06N 3/063 |
| 2021/0097641 A1 * | 4/2021 | Iyer | G06F 9/5072 |
| 2021/0110187 A1 * | 4/2021 | Pillai | G06V 10/955 |
| 2021/0326189 A1 * | 10/2021 | Shah | G06N 3/063 |

* cited by examiner

*Primary Examiner* — Tan V Mai
(74) *Attorney, Agent, or Firm* — Finnegan, Henderson, Farabow, Garrett & Dunner, LLP

(57) ABSTRACT

The present disclosure relates to a method for controlling execution of a GEMM operation on an accelerator comprising multiple computation units, a first memory device, and a second memory device. The method comprises determining an execution manner of the GEMM operation, the execution manner comprising partition information of the GEMM operation and computation unit allocation information of the partitioned GEMM operation; generating one or more instructions to compute the partitioned GEMM operation on one or more allocated computation units; and issuing the one or more instructions to at least one of a first queue and a second queue, which enables at least one of a first local controller and a second local controller to execute the one or more instructions, wherein the first local controller and the second local controller are configured to control data movement between the computation units, the first memory device, and the second memory device.

22 Claims, 9 Drawing Sheets

PROGRAMMABLE AND HIERARCHICAL CONTROL OF EXECUTION OF GEMM OPERATION ON ACCELERATOR

BACKGROUND

General matrix multiplication (GEMM) is widely used in various areas including deep learning, machine learning, and image processing. GEMM plays a significant role in neural networks such as DNNs (deep neural networks). When executing a GEMM operation on an accelerator, the GEMM operation is generally partitioned into many tiles and the partitioned tiles are executed, preferably in parallel, on multiple processing units. Optimizing GEMM operation tiling and execution thereof on an accelerator is important to improve overall neural network performance.

SUMMARY OF THE DISCLOSURE

Embodiments of the present disclosure provide an apparatus for controlling execution of a GEMM (general matrix multiply) operation on an accelerator comprising multiple computation units, a first memory device, and a second memory device. The apparatus comprises a global controller comprising circuitry configured to: determine an execution manner of the GEMM operation, the execution manner comprising partition information of the GEMM operation and computation unit allocation information of the partitioned GEMM operation, generate one or more instructions to compute the partitioned GEMM operation on one or more allocated computation units among the multiple computation units, and issue the one or more generated instructions. The apparatus further comprises a plurality of local controllers including a first local controller and a second local controller, the first local controller being configured to control data movement between the computation units and the first memory device and the second local controller being configured to control data movement between the first memory device and the second memory device; and a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

Embodiments of the present disclosure provide a method for controlling execution of a GEMM (general matrix multiply) operation on an accelerator comprising multiple computation units, a first memory device, and a second memory device. The method comprises determining an execution manner of the GEMM operation, the execution manner comprising partition information of the GEMM operation and computation unit allocation information of the partitioned GEMM operation; generating one or more instructions to compute the partitioned GEMM operation on one or more allocated computation units among the multiple computation units; and issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

Embodiments of the present disclosure also provide a non-transitory computer readable medium that stores a set of instructions that is executable by at least one processor of a computing device to perform a method for controlling execution of a GEMM (general matrix multiply) operation on an accelerator comprising multiple computation units, a first memory device, and a second memory device. The method comprises determining an execution manner of the GEMM operation, the execution manner comprising partition information of the GEMM operation and computation unit allocation information of the partitioned GEMM operation; generating one or more instructions to compute the partitioned GEMM operation on one or more allocated computation units among the multiple computation units; and issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

Embodiments of the present disclosure also provide a terminal comprising a host unit and an accelerator for controlling execution of a GEMM (general matrix multiply) operation. The accelerator comprises multiple computation units, a first memory device, and a second memory device; and a global controller comprising circuitry configured to: determine an execution manner of the GEMM operation, the execution manner comprising partition information of the GEMM operation and computation unit allocation information of the partitioned GEMM operation, generate one or more instructions to compute the partitioned GEMM operation on one or more allocated computation units among the multiple computation units, and issue the one or more generated instructions. The accelerator further comprises a plurality of local controllers including a first local controller and a second local controller, the first local controller being configured to control data movement between computation units and the first memory device and the second local controller being configured to control data movement between the first memory device and the second memory device; and a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

General matrix multiplication (GEMM) plays a paramount role in neural networks such as DNNs. In order to optimize a GEMM operation execution on computation units processing units of an accelerator, the matrix is generally partitioned into multiple tiles and the partitioned tiles are executed in parallel on multiple computation units. GEMM tiling method will be briefly explained as an example referring to FIG. 1 that illustrates example GEMM tiling, consistent with some embodiments of the present disclosure.

Figure 1:
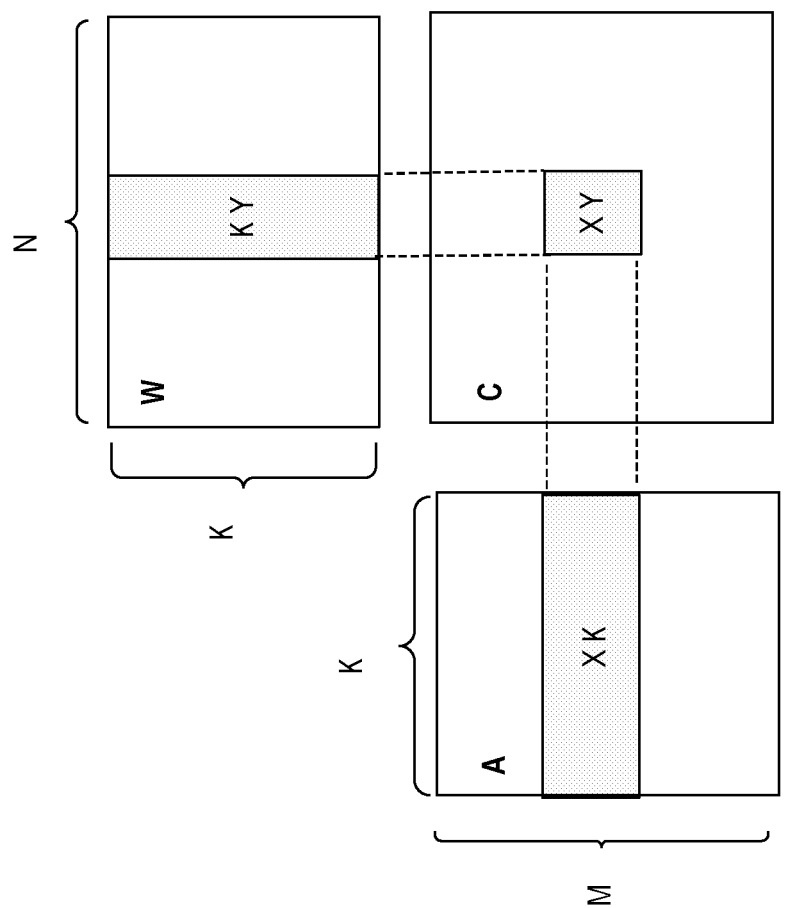
FIG. 1 illustrates example GEMM tiling, consistent with some embodiments of the present disclosure.

As shown in FIG. 1, a GEMM operation is a matrix multiplication operation as follows: C=A*W, where a GEMM operation has size M×N×K, activation matrix A has size M×K, weight matrix W has size K×N, and output matrix C has size M×N. Here, bias matrix addition element is omitted for simplicity.

The output matrix C can be partitioned into multiple tiles with size X×Y and execution for obtaining multiple tiles of the output matrix C are assigned to multiple computation units. As shown in FIG. 1, to obtain each tile with size X×Y, a corresponding computation unit needs to access data for a section with size X×K of activation matrix A and a section with size K×Y of weight matrix W. In this way matrix tiling is performed and multiple tiles of a GEMM operation can be executed, preferably in parallel, on multiple computation units. Here, each computation unit for computing a certain tile of the output matrix C can receive data for corresponding sections of activation matrix A and weight matrix W as inputs. Depending on the memory capacity and available resources, the K dimension of the section with size X×K of activation matrix A and of the section with size K×Y of weight matrix W may also be partitioned into multiple segments so that multiple smaller GEMM tiles can be executed while exploiting parallelism.

GEMM tiling and parallel execution have been performed in accordance with a predetermined sequence. For example, a GEMM operation is partitioned into multiple tiles with a certain fixed size and parallel execution of the multiple tiles are performed according to a predetermined series of instruction. Under a such fixed control scheme, when an input GEMM operation has a size that is not suitable for being partitioned into the certain fixed size, zero padding for the GEMM operation may be performed to adapt the GEMM operation to have an adequate size for the partition before tiling the GEMM operation. Further, the fixed control scheme does not allow flexible scheduling sequences (e.g., a series of instruction to calculate a GEMM operation) that take into account computing resources or bandwidth utilization efficiency. Thereby, such a fixed control scheme often degrades resource utilization efficiency and reduces bandwidth while GEMM operation tiling and execution thereof in accordance with a predetermined sequence usually lessen controlling burden on the controller side. For example, processing elements on a certain computation unit can be wasted for executing zero values that have been padded for size matching. Moreover, such control of GEMM tiling and execution may need redesigning a controller or control scheme when there is a change in a memory subsystem.

According to some embodiments of the present disclosure, programmable and hierarchical control of GEMM operation tiling and parallel execution can be provided. According to some embodiments of the present disclosure, GEMM execution efficiency can be improved based on flexible control of GEMM operation tiling and execution thereof. Some embodiments of the present disclosure can provide efficient and dynamic GEMM tiling depending on a GEMM size and available resource capacities. According to some embodiments of the present disclosure, a controlling scheme for GEMM tiling and execution thereof can be scaled and adapted to different memory subsystems including a memory level, a memory bandwidth, memory capacity, etc.

Figure 2A:
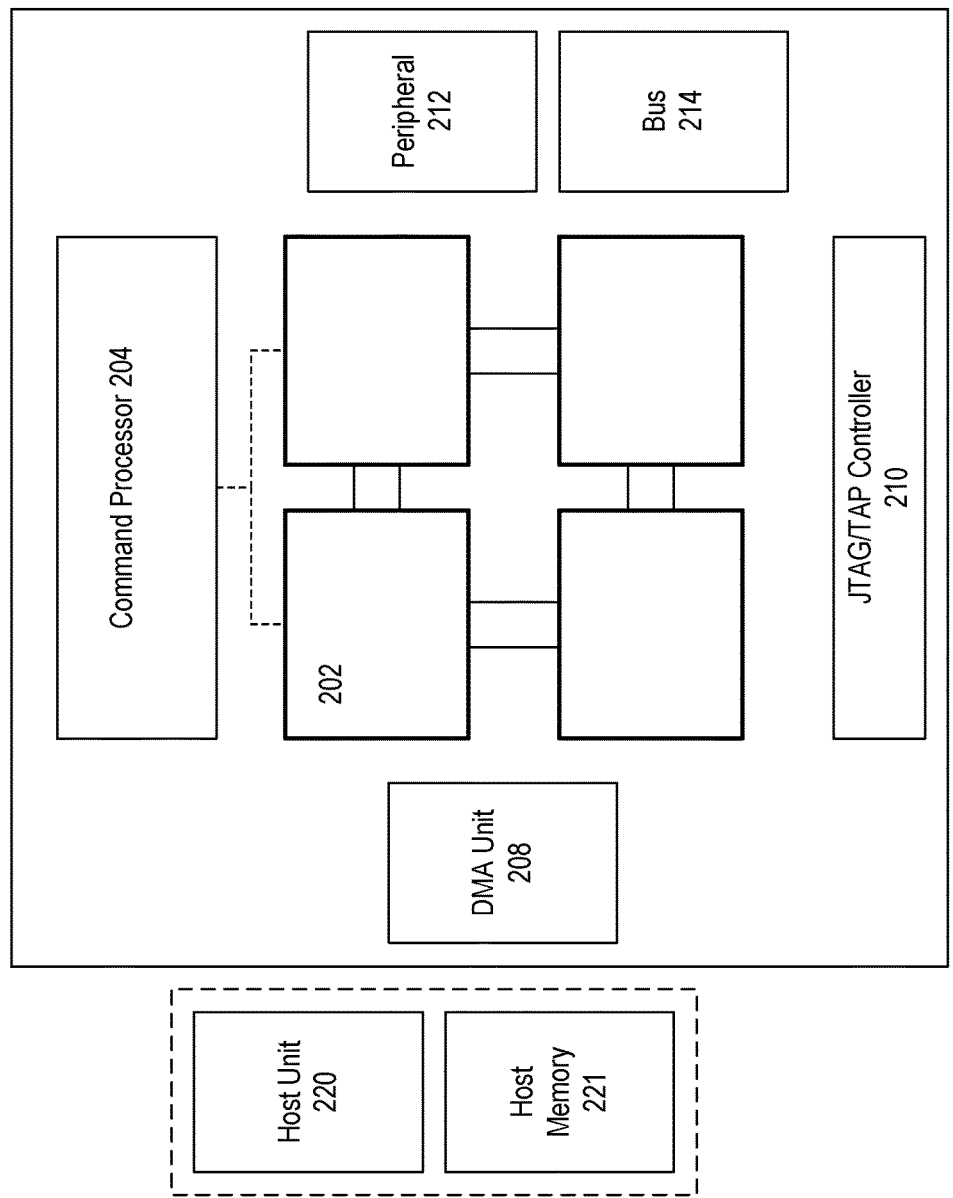
FIG. 2A illustrates an exemplary neural network accelerator architecture, consistent with some embodiments of the present disclosure.

FIG. 2A illustrates an exemplary neural network accelerator architecture, consistent with some embodiments of the present disclosure. In the context of this disclosure, a neural network accelerator may also be referred to as a machine learning accelerator or deep learning accelerator. In some embodiments, accelerator 200 may be referred to as a neural network processing unit (NPU) 200. As shown in FIG. 2A, accelerator 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that, cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit 220 under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator 200. For example, DMA unit 208 can assist with transferring data between multiple cores 202 or within each core. Thus, DMA unit 208 can also generate memory addresses and initiate memory read or write cycles. DMA unit 208 can also contain several hardware registers that can be written and read by the one or more processors, including a memory address register, a byte-count register, one or more control registers, and other types of registers. These registers can specify some combination of the source, the destination, the direction of transfer (reading from the input/output (I/O) device or writing to the I/O device), the size of the transfer unit, or the number of bytes to transfer in one burst. It is appreciated that accelerator 200 can include a second DMA unit, which can be used to transfer data between other accelerators to allow multiple accelerators to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a I²C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores 202 and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator 200 can also communicate with host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator 200 to be used for executing neural network models.

In some embodiments, a host system having host unit 220 and host memory 221 can comprise a compiler (not shown). The compiler is a program or computer software that transforms computer codes written in one programming language into instructions for accelerator 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator 200. As discussed above, these commands can be further processed by command processor 204 of accelerator 200, temporarily stored in an instruction buffer of accelerator 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator 200. The loaded instructions may then be distributed to each core (e.g., core 202 of FIG. 2A) assigned with the corresponding task, and the one or more cores may process these instructions.

Figure 2B:
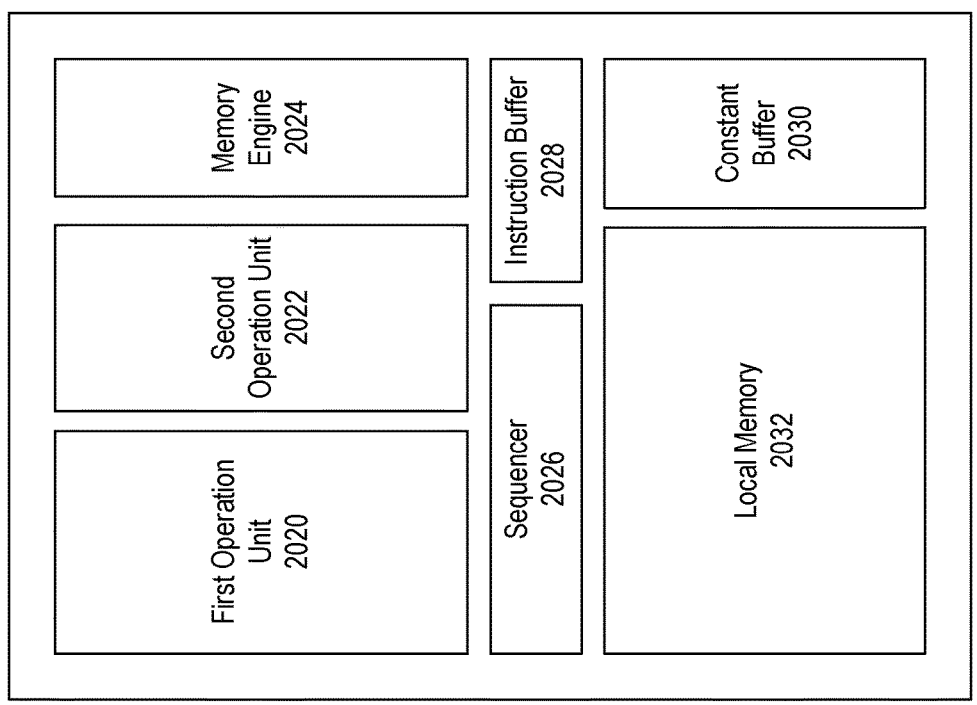
FIG. 2B illustrates an exemplary neural network accelerator core architecture, consistent with some embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to another accelerator) or from core 202 (e.g., from a local memory in core 202). It is appreciated that more than one memory controller can be provided in accelerator 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

Accelerator 200 of FIG. 2A can be utilized in various neural networks, such as deep neural networks (DNNs), recurrent neural networks (RNNs), convolutional neural networks (CNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like.

FIG. 2B illustrates an exemplary core architecture, consistent with embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations including GEMM operations.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
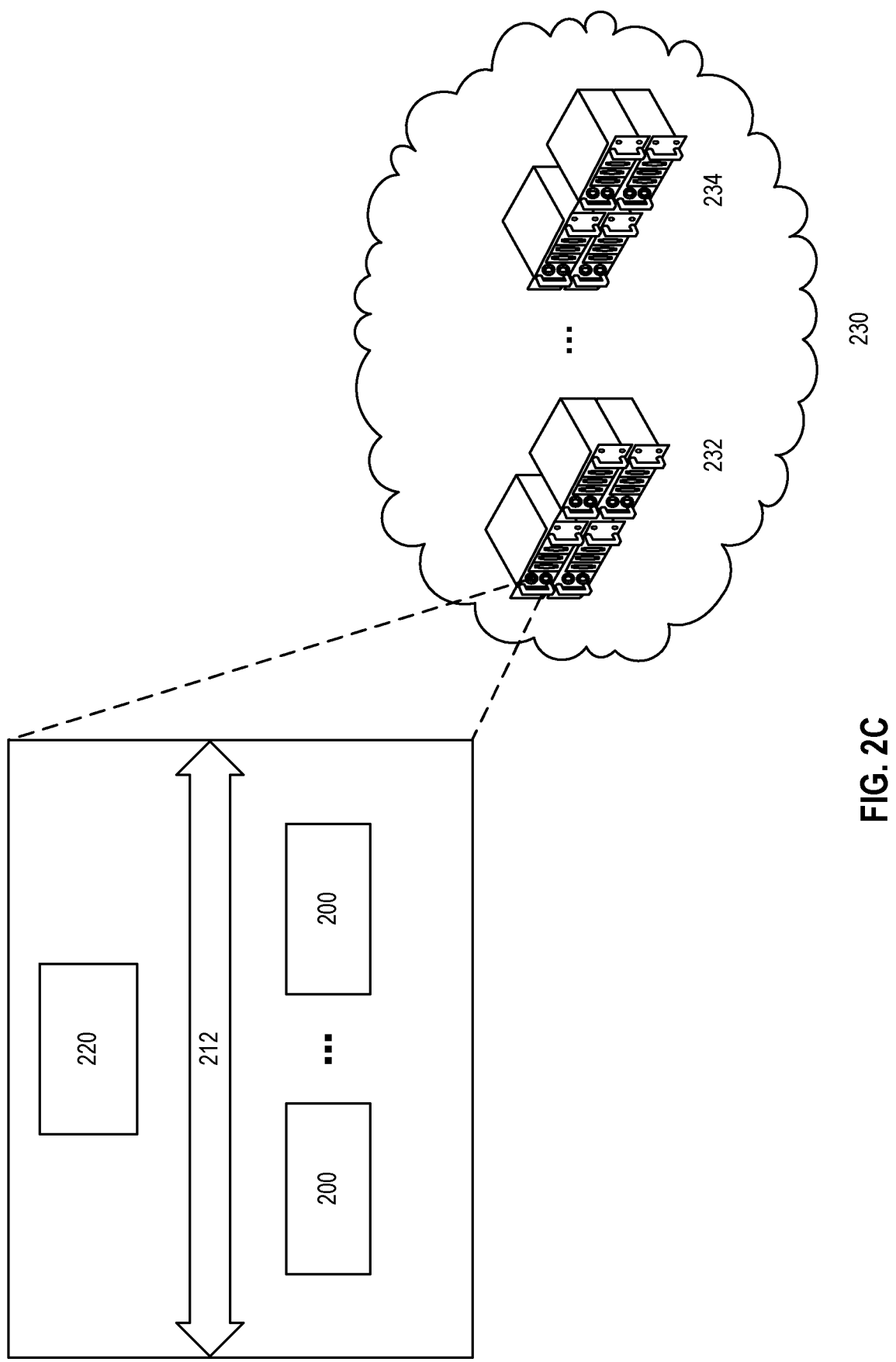
FIG. 2C illustrates a schematic diagram of an exemplary cloud system incorporating a neural network accelerator, consistent with some embodiments of the present disclosure.

FIG. 2C illustrates a schematic diagram of an exemplary cloud system incorporating accelerator 200, consistent with some embodiments of the present disclosure. As shown in FIG. 2C, cloud system 230 can provide a cloud service with artificial intelligence (AI) capabilities and can include a plurality of computing servers (e.g., 232 and 234). In some embodiments, a computing server 232 can, for example, incorporate a neural network accelerator 200 of FIG. 2A. Neural network accelerator 200 is shown in FIG. 2C in a simplified manner for simplicity and clarity.

With the assistance of neural network accelerator 200, cloud system 230 can provide the extended AI capabilities of image recognition, facial recognition, translations, 3D modeling, and the like. It is appreciated that, neural network accelerator 200 can be deployed to computing devices in other forms. For example, neural network accelerator 200 can also be integrated in a computing device, such as a smart phone, a tablet, and a wearable device.

Figure 3:
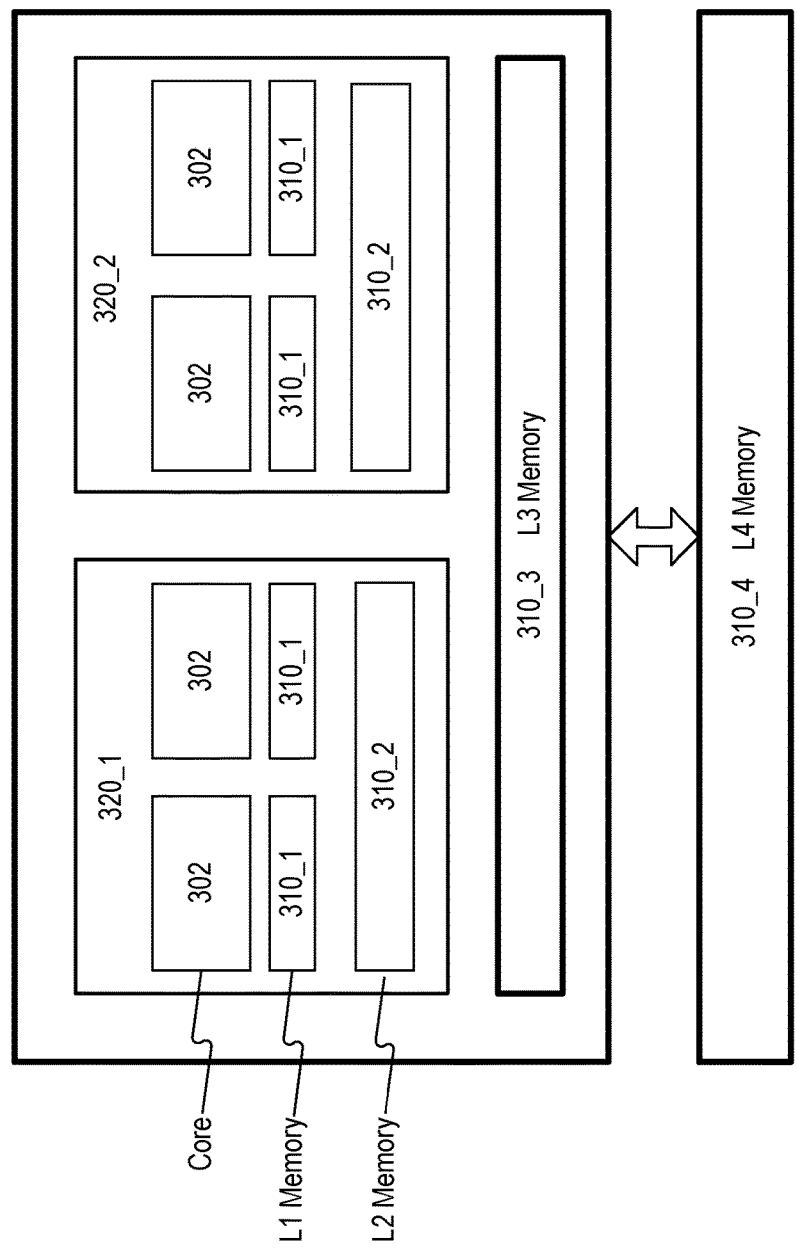
FIG. 3 illustrates an example memory subsystem architecture of an accelerator, consistent with some embodiments of the present disclosure.

FIG. 3 illustrates an example memory subsystem architecture of an accelerator, consistent with some embodiments of the present disclosure. According to some embodiments of the present disclosure, accelerator 300 can be accelerator 200 in FIG. 2A and core 302 can be core 202 in FIG. 2A and FIG. 2B. It will be appreciated that some components of accelerator 300 are omitted in FIG. 3 for simplicity and clarity. FIG. 3 illustrates four cores 302 on accelerator 300 as an example.

As shown in FIG. 3, accelerator 300 may have multiple levels of a memory hierarchy. For example, accelerator 300 may comprise first level (L1) memory 310_1, second level (L2) memory 310_2, and third level (L3) memory 310_3. In some embodiments, accelerator 300 may have a plurality of L1 memories 310_1 and FIG. 3 illustrates each core 302 having its own L1 memory 310_1. In some embodiments, two or more cores 302 share one L2 memory 310_2 and FIG. 3 illustrates two cores 302 sharing one L2 memory 310_2 as an example. In some embodiments, accelerator 300 may comprise L3 memory 310_3 supporting a plurality of cores 302 and FIG. 3 illustrates four cores 302 sharing one L3 memory 310_3. In some embodiments, L3 memory 310_3 can be a global memory or a main memory of accelerator 300. As shown in FIG. 3, accelerator 300 can communicate with L4 memory 310_4. In this example, L4 memory 310_4 can be an external memory. In some embodiments, L4 memory 310_4 can be a host side memory (e.g., host memory 221 in FIG. 2A) or an off-chip memory of accelerator 300.

When core 302 initiates execution of a GEMM operation, input data (e.g., activation data and weight data) can be transferred from L4 memory 310_4 to the core 302 via L3 memory 310_3, L2 memory 310_2, and L1 memory 310_1 corresponding to the core 302. When core 302 completes execution of a GEMM operation, result data can be transferred from the core 302 back to L4 memory (310_4) via the L1 memory 310_1, L2 memory 310_2, and L3 memory 310_3. In some embodiments, a lower-level memory device may have a smaller capacity but higher speed than those of a higher-level memory device. For example, L1 memory 310_1 is smaller but faster than L2 memory 310_2. While FIG. 3 illustrates accelerator 300 comprising four levels of a memory hierarchy, it will be appreciated that any level of memory hierarchy can be used as a memory subsystem in accelerator 300.

It will be appreciated that an accelerator architecture in FIG. 3 is scalable according to some embodiments of the present disclosure. As shown in FIG. 3, components (e.g. core 302, L1 memory 310_1, and L2 memory 310_2) in first group 320_1 are not interconnected with components in second group 320_2. Thereby, scaling up a size of accelerator 300 can be implemented by adding another group of components similar to first group 320_1 and second group 320_2. For example, third and fourth groups (not shown), each including two cores, can be added in accelerator 300. In this example, the memory subsystem of accelerator 300 may increase a depth of a memory hierarchy from three levels (e.g., L1 to L3 memories 310_1 to 310_3) to four levels by adding another level of memory to be shared by all cores in first to fourth groups. Some embodiments of the present disclosure can provide a controlling scheme of GEMM tiling and execution thereof, which can be adapted to various memory subsystem architectures.

Figure 4:
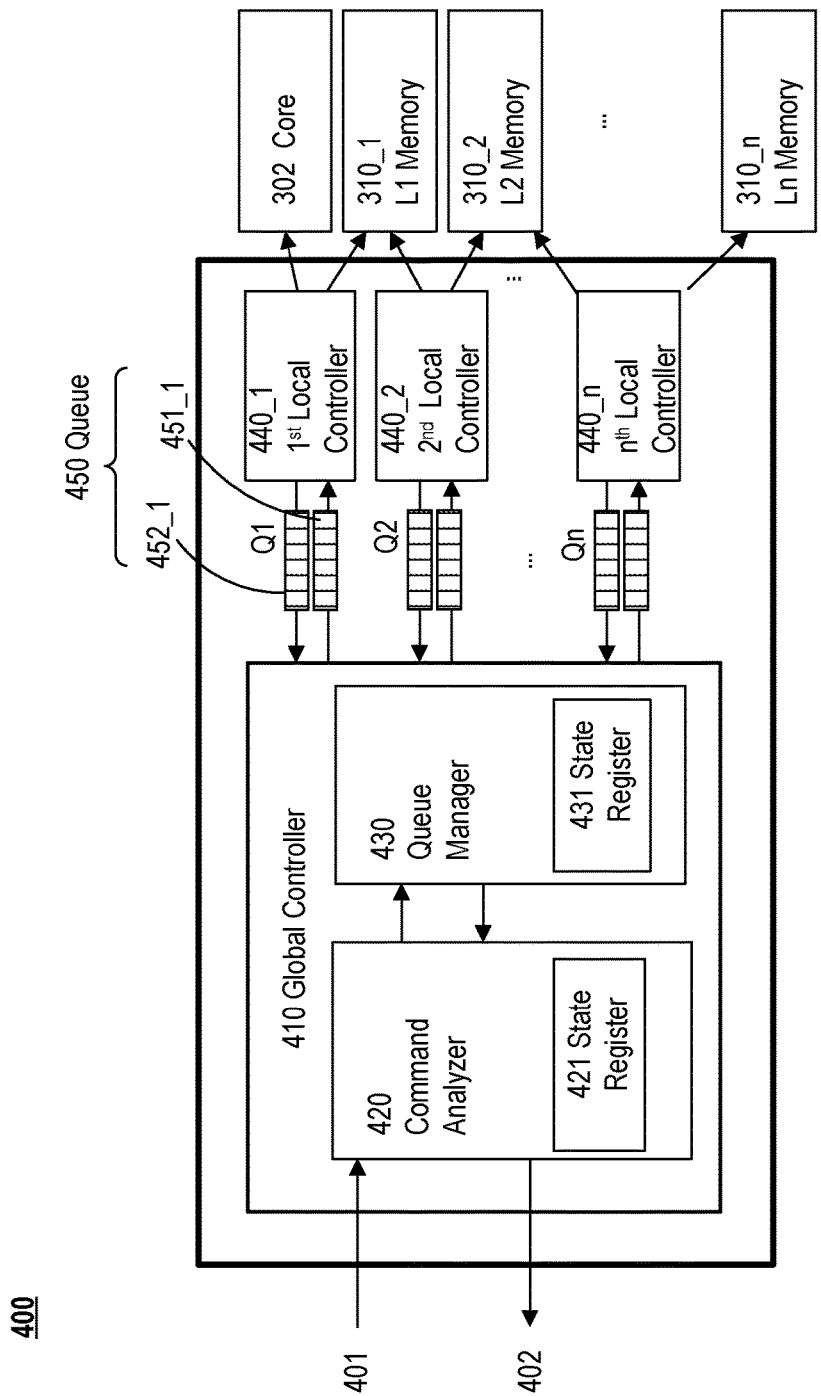
FIG. 4 illustrates a block diagram of an exemplary apparatus for controlling execution of a GEMM operation on an accelerator, consistent with some embodiments of the present disclosure.

FIG. 4 illustrates a block diagram of an exemplary apparatus for controlling execution of a GEMM operation on an accelerator, consistent with some embodiments of the present disclosure. According to some embodiments, apparatus 400 may be part of an accelerator (e.g., accelerator 200 of FIG. 2A or accelerator 300 of FIG. 3). According to some embodiments, at least part of apparatus 400 may be separate from an accelerator. As shown in FIG. 4, apparatus 400 may comprise global controller 410, a plurality of local controllers 440, and a plurality of queues 450 corresponding to the plurality of local controllers 440. As shown in FIG. 4, global controller 410 and local controllers 440 are coupled via queues 450, which enables apparatus 400 to provide hierarchical and flexible control of a GEMM operation execution on accelerator 300.

Global controller 410 may comprise command analyzer 420 and queue manager 430, consistent with some embodiments of the present disclosure. In some embodiments, command analyzer 420 can be part of or separate from command processor 204 of FIG. 2A. command analyzer 420 is configured to receive command(s) and to determine an optimal execution manner for the received command(s). In some embodiments, commands may comprise a GEMM operation execution command and command analyzer 420 is configured to determine how to partition the GEMM operation based on a size of the GEMM operation size, available computation units, computation capacities of available computation units, available memory devices, memory bandwidths of available memory devices, etc. In some embodiments, an optimal execution manner determined by command analyzer 420 may further comprise task assigning among available computation units. For example, command analyzer 420 can determine which computation unit is assigned to execute a certain partitioned tile of a GEMM operation. Here, computation unit can be a core (e.g., core 202 of FIG. 2A or core 302 of FIG. 3) or a processing element included in a core. For illustration purpose, core 302 will be used as a computation unit in the below explanation.

In some embodiments of the present disclosure, command analyzer 420 can perform its role by running a software program, which is reprogrammable. For example, command analyzer 420 can be implemented by a processor compiling program codes or computer software codes. In some embodiments, command analyzer 420 can be implemented as a programmable firmware, which can be updated or changed depending on analysis strategy changes, accelerator hardware changes including a memory subsystem change, etc.

According to some embodiments of the present disclosure, command analyzer 420 can provide queue manage 430 with information of an optimal execution manner corresponding to a received GEMM operation command. In some embodiments of the present disclosure, command analyzer may provide a command issuer with an execution result of a received GEMM operation command. In some embodiments, a command issuer can be a host unit (e.g., host unit 220 of FIG. 2A) or a bigger system including the current accelerator executing the received command.

In some embodiments, command analyzer 420 may further comprise state register 421 configured to store statuses of cores 302 and memories 310_1 to 310_n, According to some embodiments, state register 421 can store statuses based on execution responses received from queue manager 430 and execution responses will be explained in detail later. Command analyzer 420 can determine an optimal execution manner at least in part by referring to state registers 421.

Queue manager 430 is configured to receive an optimal execution manner determined by command analyzer 420 and to manage queues 450 according to the received optimal execution manner. In some embodiments, queue manager 430 can be configured to generate instructions according to an optimal execution manner determined by command analyzer 420. Instructions may include a series of instructions defining cores (e.g., core 202 or 302 of FIG. 2A or FIG. 3) to execute partitioned tiles, timing of execution, data movement among cores 302 and multiple memory device, timing of data movement, etc.

According to some embodiments, queue manager 430 is configured to send instructions to inbound queues 451. In some embodiments, queue manager 430 is configured to manage queues 450 so that synchronization in data movement and operation execution can be achieved. For example, in order to compute a GEMM operation on a core 302 at a certain cycle, input data for executing the operation should be provided to the core 302 before the certain cycle. Such synchronization is important to achieve execution parallelism and efficiency. Queue manager 430 will be explained in detail with respect to FIG. 5A and FIG. 5B later.

Referring back to FIG. 4, local controller 440 is configured to control data movement among cores 302 and a plurality of memory devices 310 according to instructions received from inbound queues 451. As shown in FIG. 4, a first local controller 440_1 is responsible for data movement between core 302 302 and L1 memory 310_1, a second local controller 440_2 is responsible for data movement between L1 memory 310_1 and L2 memory 310_2, and similarly, $n^{th}$ local controller 440_n is responsible for data movement between Ln-1 memory (not shown) and Ln memory 310_n.

In some embodiments, L1 memory 310_1 and L2 memory 310_2 can be L1 memory 310_1 and L2 memory 310_2 of FIG. 3 and Ln memory 310_n can correspond to L4 memory of FIG. 3. In some embodiment, core 302 can be a GEMM core. According to some embodiments, local controllers 440 can assist with transferring data, e.g., between core 302 and L1 memory 310_1, L1 memory 310_1 and L2 memory 310_2, etc. In some embodiments, DMA units on an accelerator can be used as local controllers 440_1 to 440_n. For example, DMA unit 208 of FIG. 2A can be used as local controller 440, such as first DMA unit is used as first local controller 440_1, second DMA unit is used as second local controller 440_2, etc. In some embodiments, local controller 440 can be implemented as a custom designed circuit (e.g., a finite state machine), a microcontroller, or a micro-processor, etc. It will be appreciated that because local controller 440 is configured to execute instructions coming in from inbound queue 451, local controller 440 can also be utilized regardless of analysis strategy changes in command analyzer 420.

Although FIG. 4 illustrates one component for each core 302, L1 memory 310_1, L2 memory 310_2, and Ln memory 310_n, it will be appreciated that multiple components for each core 302, L1 memory 310_1, L2 memory 310_2, and Ln memory 310_n can be included. Similarly, while FIG. 4 illustrates one local controller 440 for each level, it will also be appreciated that any number of first local controller 440_1, second local controller 440_2, and $n^{th}$ local controller 440_n can be included. Further, according to some embodiments of the present disclosure, local controller can be added or removed depending changes in memory subsystem architectures apparatus supports 400 in controlling execution of a GEMM operation.

Queue 450 is configured to provide instructions to local controller 440 and to receive responses from local controller 440, consistent with some embodiments of the present disclosure. In some embodiments, queue 450 may include inbound queue 451 for instructions to local controller 440 and outbound queue 452 for responses from local controller 440. As shown in FIG. 4, each local controller 440 can have each corresponding inbound queue 451 and outbound queue 452. For example, inbound queue 451_1 and outbound queue 452_1 are assigned to first local controller 440_1 and similarly each local controller 440_2 to 440_n is assigned with its own inbound queue and outbound queue. In some embodiments, inbound queue 451 is configured to receive instruction from queue manager 430 and to push the instructions to corresponding local controller 440 and outbound queue 452 is configured to receive responses from corresponding local controller 440 and to push the responses to queue manager 430. In some embodiments, inbound queue 451 and outbound queue 452 can be configured as a FIFO (first in first out) queue.

In some embodiments, a response from local controller 440 can be information indicating whether execution of a corresponding instruction has succeeded or failed. In some embodiments, when execution of a corresponding instruction has failed, a response from local controller 440 can further comprise information indicating a reason of failure. For example, when an instruction to transfer data from core 302 to L1 memory 310_1 is delivered to first local controller 440_1 and corresponding data movement cannot be completed or fails, such response indicating an execution result (e.g., success or failure) and/or a reason for failure is delivered to queue manager 430 via queue 450 and can be stored in state register 431 of queue manager 430.

According to some embodiments, such response can be transmitted to command analyzer 420 and can be stored in state register 421 of command analyzer 420. According to some embodiments of the present disclosure, queue manager 430 may transfer responses received via queue 450, in particular, outbound queue 452_1 and command analyzer 420.

Figure 5A:
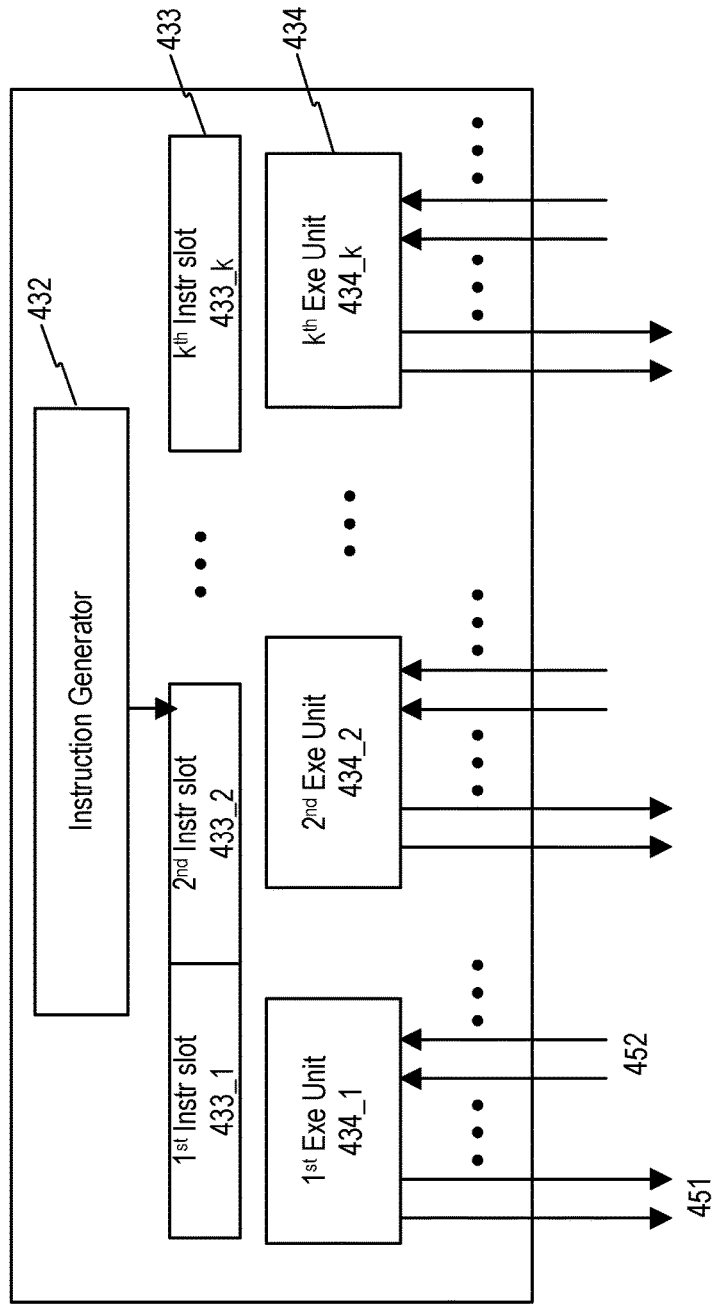
FIG. 5A illustrates an example queue manager configuration, consistent with some embodiments of the present disclosure.

FIG. 5A illustrates an example queue manager configuration, consistent with some embodiments of the present disclosure. As shown in FIG. 5A, queue manager 430A may comprise instruction generator 432, instruction register 433, and a plurality of execution units 434. While instruction generator 432 is illustrated as included in queue manager 430, it will be appreciated that instruction generator 432 can be included in command analyzer 420 depending on embodiments of the present disclosure.

According to some embodiments, instruction generator 432 is configured to receive an optimal execution manner determined by command analyzer 420 and to generate instructions according to the received optimal execution manner. Instructions may include a series of instructions defining cores 302 to execute partitioned tiles, timing of execution, data movement among cores 302 and multiple memories, timing of data movement, etc. In some embodiments, instructions can be generated depending on information from command analyzer 420. For example, according to the GEMM operation tiling strategy determined by command analyzer 420, instructions to execute tiles of the GEMM operation on GEMM cores 302, e.g., in parallel can be issued. According to the instructions, local controllers 440 can coordinate operations of cores 302 and multiple memories 310 to execute partitioned tiles of a GEMM operation efficiently, preferably in parallel.

As shown in FIG. 5A, instruction register 433 can comprise a plurality of instruction slots 433_1 to 433_k corresponding to the plurality of execution units 434. For example, first instruction slot 433_1 stores instruction(s) for first execution unit 434_1, second instruction slot 433_2 stores instruction(s) for second execution unit 434_2, and similarly $k^{th}$ instruction slot 433_k stores instruction(s) for $k^{th}$ execution unit 434_k.

In some embodiments, instruction generator 432 may be configured to issue an instruction to be processed by each execution unit 434 every cycle, and instruction register 433 is configured to store the received instruction. In turn, instruction register 433 can provide, every cycle, k number of instructions each of which is processed by execution units 434_1 to 434_k.

According to some embodiments, one execution unit 434 can be assigned to process instructions for at least one queue 451 or 452. In some embodiments, two different execution units 434 can be assigned to process instructions for inbound queue 451 and outbound queue 452 of one local controller 440. For example, first execution unit 434_1 can process instructions for inbound queue 451_1 for first local controller 440_1 and second execution unit 434_2 can process instructions for outbound queue 452_1 for first local controller 440_1. In some embodiments, execution unit 434 can process instructions from corresponding instruction slot 433 and push instructions to corresponding inbound queue 451. In some embodiments, execution unit 434 can receive responses from assigned outbound queue 452 and update corresponding queue status in state register 431 with the received responses.

In some embodiments, when issuing instructions, instruction generator 432 can refer to states of execution units 434. For example, when first execution unit 434_1 and second execution unit 434_2 are assigned to inbound queue 451_1 and the first execution unit 434_1 is busy while the second execution unit 434_2 is idle, an instruction for first local controller 440_1 can be issued to second instruction slot 433_2 to be processed by the second execution unit 434_2. Also, instructions can be issued depending on states of state register 431. For example, when state register 431 indicates that certain queue 451 or 452 is full of pending instructions, instructions for the certain queue may be issued after the queue is emptied. In some other examples, when state register 431 indicates that execution of a certain instruction has failed, instructions for retrying execution of the instruction can be issued.

Referring back to FIG. 4, according to some embodiments of the present disclosure, command analyzer 420 may be configured to receive states of queue manager 430 including execution units 434. For example, command analyzer 420 can receive information from state register 431 of queue manager 430. In some embodiments of the present disclosure, command analyzer 420 can determine an optimal execution manner by referring to the information received from queue manager 430.

Figure 5B:
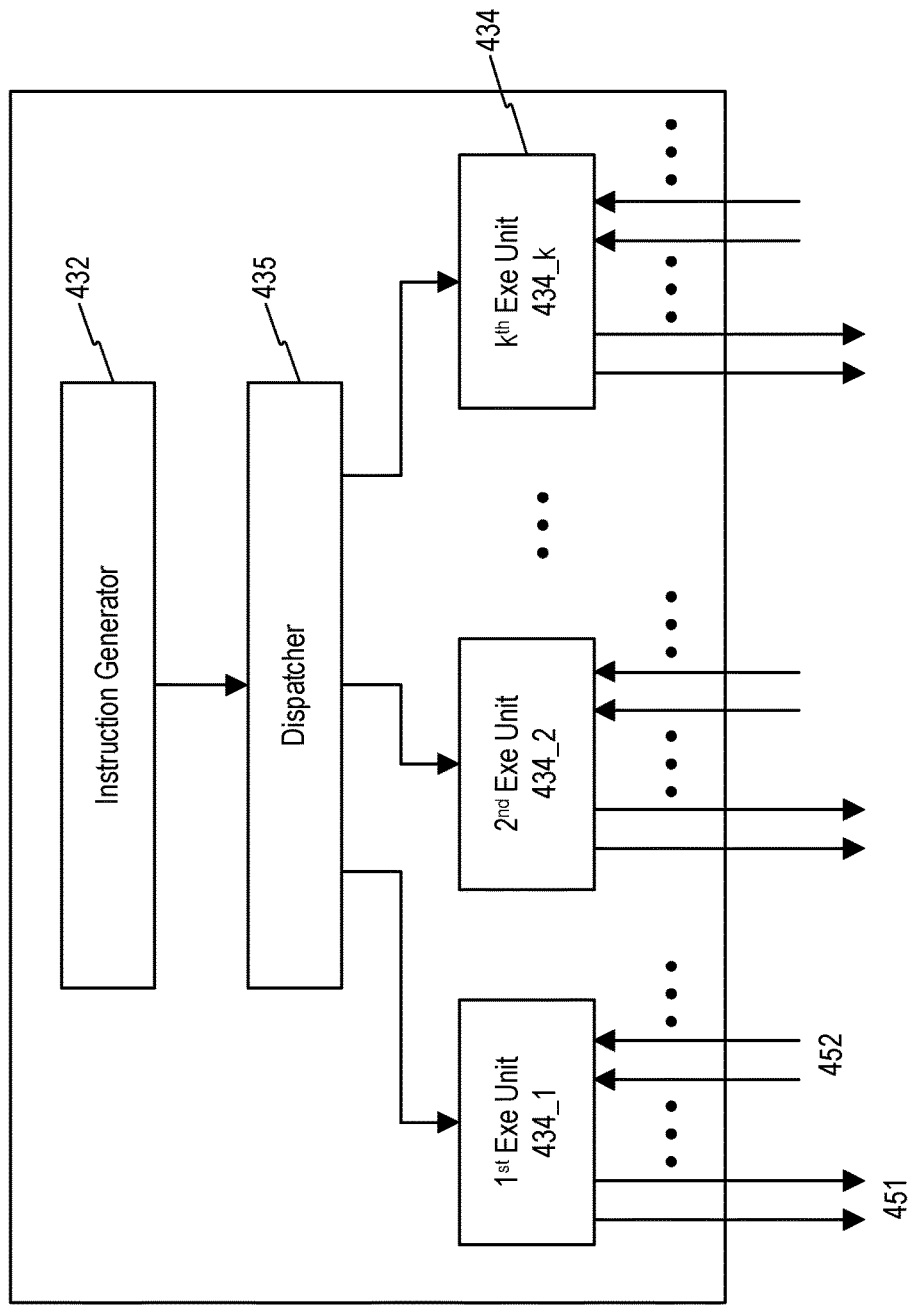
FIG. 5B illustrates another example queue manager configuration, consistent with some embodiments of the present disclosure.

FIG. 5B illustrates another example queue manager configuration, consistent with some embodiments of the present disclosure. It is noted that queue manager 430B of FIG. 5B is similar to queue manager 430A of FIG. 5A and only differences will be explained below for simplicity. As shown in FIG. 5B, queue manager 430B comprises dispatcher 435 configured to receive instructions generated by instruction generator 432 and to dispatch one or more instructions per cycle to designated execution unit(s) 434. In some embodiments, dispatcher 435 may be configured to timely provide instruction(s) to at least one of execution units 434 to execute the task on computation units 302 preferably while achieving parallelism. In this example, dispatcher 435 may sort instructions in order for parallel execution of the task.

While command analyzer 420 and queue manager 430 are explained as separate components in the above, it will be appreciated that command analyzer 420 and queue manager 430 can be implemented as one component. In some embodiments, global controller 410 can be implemented as a core configured to run software programs to perform operations of command analyzer 420 and queue manager 430.

Some embodiments of the present disclosure can provide a controlling scheme of GEMM tiling and execution thereof, which can be adapted to various memory subsystem architectures. According to some embodiments of the present disclosure, hierarchical control of GEMM tiling and execution thereof can be obtained in that global controller 410 and local controllers 440 are coupled via queues and global controller 410 can be reprogrammable without changing local controllers 440. According to some embodiments of the present disclosure, flexible management of GEMM operation tiling and execution can be provided depending on available hardware resources on an accelerator and GEMM operation execution performance requirements. According to some embodiments of the present disclosure, a controlling scheme of GEMM tiling and execution thereof can be adapted to apply to different depths of a memory hierarchy, memory capacities, memory bandwidths, etc. According to some embodiments of the present disclosure, a controlling scheme of GEMM tiling and execution thereof can be dynamically changed depending on available hardware resources on an accelerator and GEMM operation execution performance requirements. According to some embodiments of the present disclosure, programmable and hierarchical control of GEMM operation tiling and parallel execution can be provided. According to some embodiments of the present disclosure, GEMM execution efficiency can be improved based on flexible control of GEMM operation tiling and execution thereof. Some embodiments of the present disclosure can provide efficient and dynamic GEMM tiling depending on a GEMM size and available resource capacities. According to some embodiments of the present disclosure, a controlling scheme for GEMM tiling and execution thereof can be scaled and adapted to different memory subsystems including a memory level, a memory bandwidth, memory capacity, etc. Some embodiments of the present disclosure can support various video analysis tasks such as object detection, action recognition, image segmentation, etc. with high speed as well as high precision.

Figure 6:
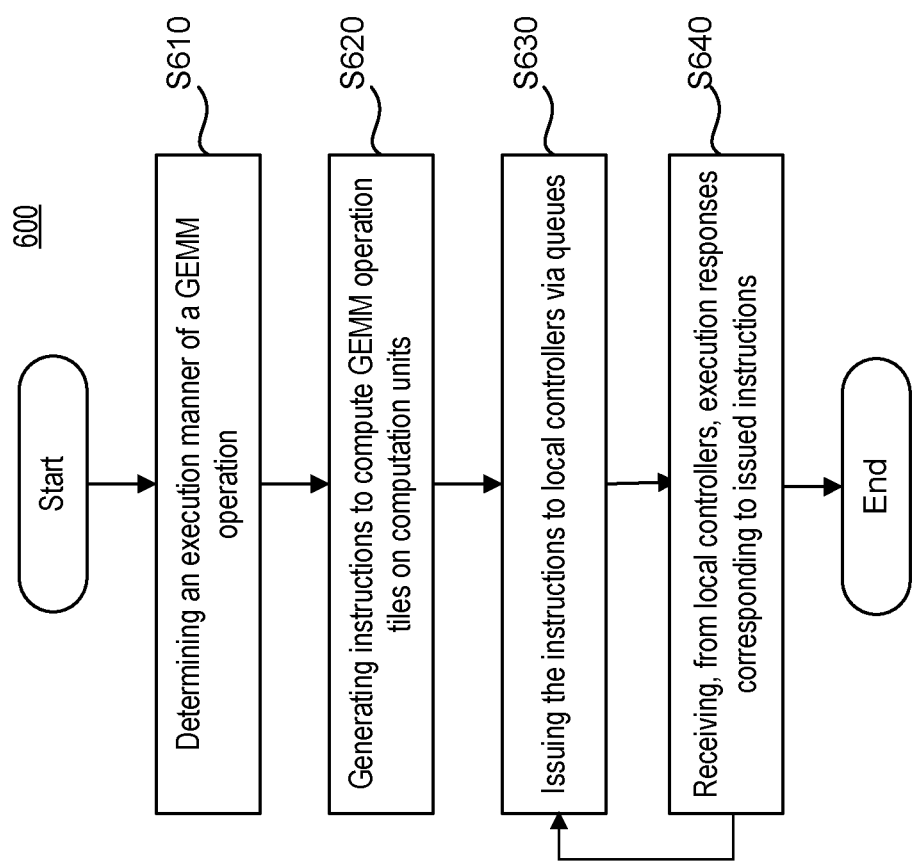
FIG. 6 illustrates an exemplary flow diagram for controlling execution of a GEMM operation on an accelerator, consistent with some embodiments of the present disclosure.

FIG. 6 illustrates an exemplary flow diagram for controlling execution of a GEMM operation on an accelerator, consistent with some embodiments of the present disclosure. For illustrative purposes, a method for controlling execution of a GEMM operation on an accelerator will be described referring to apparatus of FIG. 4. It is appreciated that in some embodiments at least part of a method for controlling execution of a GEMM operation can be performed in or, directly or indirectly, by accelerator 200 of FIG. 2A or accelerator 300 of FIG. 3.

In step S610, an execution manner of a GEMM operation is determined. Step S610 can be performed by, for example, command analyzer 420, among others. In some embodiments, in step S610, how to partition the GEMM operation can be determined based on a size of the GEMM operation size, available computation units, computation capacities of available computation units, available memory devices, memory bandwidths of available memory devices, etc. In some embodiments, an optimal execution manner may further comprise task assigning among available computation units. For example, it can be determined which computation unit is assigned to execute a certain partitioned tile of a GEMM operation.

In step S620, instructions to compute GEMM operation tiles partitioned in step S610 on computation units can be generated. Step S620 can be performed by, for example, global controller 410, command analyzer 420, or queue manger 430, among others. In some embodiments, instructions can be generated according to an optimal execution manner determined in step S610. Instructions may include a series of instructions defining cores (e.g., core 202 or 302 of FIG. 2A or FIG. 3) to execute partitioned tiles, timing of execution, data movement among cores 302 and multiple memory device, timing of data movement, etc.

In step S630, instructions generated in step S620 are issued to local controllers via queues. Step S630 can be performed by, for example, queue manger 430 or execution units 434, among others. According to the instructions, local controllers 440 can control data movements between computation units and memory devices to partitioned tiles of a GEMM operation efficiently, preferably in parallel on computation units. Instructions are provided to local controllers via queues, consistent with some embodiments of the present disclosure. In some embodiments, queue 450 may include inbound queue 451 for instructions to local controller 440. As shown in FIG. 6, in some embodiments, previous execution responses (e.g., execution success, execution failure, or failure reason, etc.) in step S640 can be considered when issuing instructions in step S630 in a later cycle. For example, when an execution response in step S640 indicates that execution of a certain instruction has failed, the certain instruction can be issued again or an instruction can be issued to avoid the same failure in a subsequent cycle.

In step S640, execution responses corresponding to issued instructions are received from local controllers. Step S640 is performed by, for example, global controller 410 or queue manger 430, among others. In some embodiments, a response from local controller 440 can be information indicating whether execution of a corresponding instruction has succeeded or failed. In some embodiments, when execution of a corresponding instruction has failed, a response from local controller 440 can further comprise information indicating a reason of failure. For example, when an instruction to transfer data from core 302 to L1 memory 310_1 is delivered to first local controller 440_1 and corresponding data movement cannot be completed or fails, such response indicating an execution result (e.g., success or failure) and/or a reason for failure is delivered to queue manager 430 via queue 450 and can be stored in state register 431 of queue manager 430. According to some embodiments, such responses can be received via queue 450, in particular, outbound queue 452 from local controllers 440. According to some embodiments of the present disclosure, such execution responses can be referred to when determining an optima execution manner in S610. In some embodiments, as discussed above, execution responses of step S640 can be used as feedbacks in step S630.

The embodiments may further be described using the following clauses:

1. An apparatus for controlling execution of a GEMM (general matrix multiply) operation on an accelerator comprising multiple computation units, a first memory device, and a second memory device, the apparatus comprising:
a global controller comprising circuitry configured to:
determine an execution manner of the GEMM operation, the execution manner comprising partition information of the GEMM operation and computation unit allocation information of the partitioned GEMM operation,
generate one or more instructions to compute the partitioned GEMM operation on one or more allocated computation units among the multiple computation units, and
issue the one or more generated instructions;
a plurality of local controllers including a first local controller and a second local controller, the first local controller being configured to control data movement between the computation units and the first memory device and the second local controller being configured to control data movement between the first memory device and the second memory device; and
a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

2. The apparatus of clause 1, wherein the global controller comprising circuitry configured to determine the execution manner of the GEMM operation further comprises:
circuitry configured to determine an execution manner of the GEMM operation based on a size of the GEMM operation, available computation units among the multiple computation units, and computation capacities of the available computation units.

3. The apparatus of clause 1 or 2, wherein the global controller comprising circuitry configured to determine the execution manner of the GEMM operation further comprises:
circuitry configured to determine an execution manner of the GEMM operation by running a software program.

4. The apparatus of any one of clauses 1 to 3, wherein the plurality of queues further comprises a third queue configured to receive, from the first local controller, an execution response of an instruction issued to the first local controller.

5. The apparatus of clause 4, wherein the execution response comprises an execution result of whether the execution has failed or succeeded and a reason of failure when the execution has failed.

6. The apparatus of clause 4, wherein the global controller comprising circuitry configured to determine the execution manner of the GEMM operation further comprises:
circuitry configured to determine an execution manner of the GEMM operation based on the execution response.

7. The apparatus of any one of clauses 1 to 6, wherein at least one of the first local controller and the second local controller is a DMA (Dynamic Memory Access) unit on the accelerator.

8. The apparatus of any one of clauses 1 to 7, wherein the global controller is configured to adapt to change in a memory subsystem of the accelerator.

9. The apparatus of any one of clauses 1 to 8, wherein the one or more instructions comprise a series of instructions defining the one or more allocated computation units to execute the partitioned GEMM operation, timing of execution of the partitioned GEMM operation, and timing of data movement among the one or more allocated computation units, the first memory device, and the second memory device.

10. A method for controlling execution of a GEMM (general matrix multiply) operation on an accelerator comprising multiple computation units, a first memory device, and a second memory device, the method comprising:

determining an execution manner of the GEMM operation, the execution manner comprising partition information of the GEMM operation and computation unit allocation information of the partitioned GEMM operation;

generating one or more instructions to compute the partitioned GEMM operation on one or more allocated computation units among the multiple computation units; and issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

11. The method of clause 10, wherein determining an execution manner of the GEMM operation comprises:

determining an execution manner of the GEMM operation based on a size of the GEMM operation, available computation units among the multiple computation units, and computation capacities of the available computation units.

12. The method of clause 10 or 11, wherein determining an execution manner of the GEMM operation comprises:

determining an execution manner of the GEMM operation by running a software program.

13. The method of any one of clauses 10 to 12, further comprising:

receiving, from the first local controller, an execution response of an instruction issued to the first local controller.

14. The method of clause 13, wherein the execution response comprises an execution result of whether the execution has failed or succeeded and a reason of failure when the execution has failed.

15. The method of any one of clauses 10 to 14, wherein at least one of the first local controller and the second local controller is a DMA (Dynamic Memory Access) unit on the accelerator.

16. A non-transitory computer readable medium that stores a set of instructions that is executable by at least one processor of a computing device to perform a method for controlling execution of a GEMM (general matrix multiply) operation on an accelerator comprising multiple computation units, a first memory device, and a second memory device, the method comprising:

determining an execution manner of the GEMM operation, the execution manner comprising partition information of the GEMM operation and computation unit allocation information of the partitioned GEMM operation;

generating one or more instructions to compute the partitioned GEMM operation on one or more allocated computation units among the multiple computation units; and issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

17. The computer readable medium of clause 16, wherein the set of instructions that are executable by at least one processor of the computing device to cause the computing device to further perform:

determining an execution manner of the GEMM operation based on a size of the GEMM operation, available computation units among the multiple computation units, and computation capacities of the available computation units.

18. The computer readable medium of clause 16 or 17, wherein the set of instructions that are executable by at least one processor of the computing device to cause the computing device to further perform:

determining an execution manner of the GEMM operation by running a software program.

19. The computer readable medium of any one of clauses 16 to 18, wherein the set of instructions that are executable by at least one processor of the computing device to cause the computing device to further perform:

receiving, from the first local controller, an execution response of an instruction issued to the first local controller.

20. The computer readable medium of clause 19, wherein the execution response comprises an execution result of whether the execution has failed or succeeded and a reason of failure when the execution has failed.

21. The computer readable medium of any one of clauses 16 to 20, wherein at least one of the first local controller and the second local controller is a DMA (Dynamic Memory Access) unit on the accelerator.

22. A terminal, comprising:
a host unit; and
an accelerator for controlling execution of a GEMM (general matrix multiply) operation, the accelerator comprising:
multiple computation units, a first memory device, and a second memory device;
a global controller comprising circuitry configured to:
determine an execution manner of the GEMM operation, the execution manner comprising partition information of the GEMM operation and computation unit allocation information of the partitioned GEMM operation,
generate one or more instructions to compute the partitioned GEMM operation on one or more allocated computation units among the multiple computation units, and
issue the one or more generated instructions;
a plurality of local controllers including a first local controller and a second local controller, the first local controller being configured to control data movement between computation units and the first memory device and the second local controller being configured to control data movement between the first memory device and the second memory device; and a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

Embodiments herein include database systems, methods, and tangible non-transitory computer-readable media. The methods may be executed, for example, by at least one processor that receives instructions from a tangible non-transitory computer-readable storage medium (such as of a host system having host unit 220 and host memory 221 of FIG. 2A). Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for controlling execution of a GEMM (general matrix multiply) operation on an accelerator comprising multiple computation units, a first memory device, and a second memory device, the apparatus comprising:
   a global controller comprising circuitry configured to:
      determine an execution manner of the GEMM operation, the execution manner comprising partition information of the GEMM operation and computation unit allocation information of the partitioned GEMM operation,
      generate one or more instructions to compute the partitioned GEMM operation on one or more allocated computation units among the multiple computation units, and
      issue the one or more generated instructions;
   a plurality of local controllers including a first local controller and a second local controller, the first local controller being configured to control data movement between the computation units and the first memory device and the second local controller being configured to control data movement between the first memory device and the second memory device; and
   a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

2. The apparatus of claim 1, wherein the global controller comprising circuitry configured to determine the execution manner of the GEMM operation further comprises:
   circuitry configured to determine an execution manner of the GEMM operation based on a size of the GEMM operation, available computation units among the multiple computation units, and computation capacities of the available computation units.

3. The apparatus of claim 1, wherein the global controller comprising circuitry configured to determine the execution manner of the GEMM operation further comprises:
   circuitry configured to determine an execution manner of the GEMM operation by running a software program.

4. The apparatus of claim 1, wherein the plurality of queues further comprises a third queue configured to receive, from the first local controller, an execution response of an instruction issued to the first local controller.

5. The apparatus of claim 4, wherein the execution response comprises an execution result of whether the execution has failed or succeeded and a reason of failure when the execution has failed.

6. The apparatus of claim 4, wherein the global controller comprising circuitry configured to determine the execution manner of the GEMM operation further comprises:
   circuitry configured to determine an execution manner of the GEMM operation based on the execution response.

7. The apparatus of claim 1, wherein at least one of the first local controller and the second local controller is a DMA (Dynamic Memory Access) unit on the accelerator.

8. The apparatus of claim 1, wherein the global controller is configured to adapt to change in a memory subsystem of the accelerator.

9. The apparatus of claim 1, wherein the one or more instructions comprise a series of instructions defining the one or more allocated computation units to execute the partitioned GEMM operation, timing of execution of the partitioned GEMM operation, and timing of data movement among the one or more allocated computation units, the first memory device, and the second memory device.

10. A method for controlling execution of a GEMM (general matrix multiply) operation on an accelerator comprising multiple computation units, a first memory device, and a second memory device, the method comprising:
  determining an execution manner of the GEMM operation, the execution manner comprising partition information of the GEMM operation and computation unit allocation information of the partitioned GEMM operation;
  generating one or more instructions to compute the partitioned GEMM operation on one or more allocated computation units among the multiple computation units; and
  issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

11. The method of claim 10, wherein determining an execution manner of the GEMM operation comprises:
  determining an execution manner of the GEMM operation based on a size of the GEMM operation, available computation units among the multiple computation units, and computation capacities of the available computation units.

12. The method of claim 10, wherein determining an execution manner of the GEMM operation comprises:
  determining an execution manner of the GEMM operation by running a software program.

13. The method of claim 10, further comprising:
  receiving, from the first local controller, an execution response of an instruction issued to the first local controller.

14. The method of claim 13, wherein the execution response comprises an execution result of whether the execution has failed or succeeded and a reason of failure when the execution has failed.

15. The method of claim 10, wherein at least one of the first local controller and the second local controller is a DMA (Dynamic Memory Access) unit on the accelerator.

16. A non-transitory computer readable medium that stores a set of instructions that is executable by at least one processor of a computing device to perform a method for controlling execution of a GEMM (general matrix multiply) operation on an accelerator comprising multiple computation units, a first memory device, and a second memory device, the method comprising:
  determining an execution manner of the GEMM operation, the execution manner comprising partition information of the GEMM operation and computation unit allocation information of the partitioned GEMM operation;
  generating one or more instructions to compute the partitioned GEMM operation on one or more allocated computation units among the multiple computation units; and
  issuing the one or more instructions to at least one of a first queue and a second queue, which enables at least one of a first local controller and a second local controller to execute the one or more instructions, wherein the first local controller is configured to control data movement between the computation units and the first memory device according to an instruction issued to the first queue and the second local controller is configured to control data movement between the first memory device and the second memory device according to an instruction issued to the second queue.

17. The computer readable medium of claim 16, wherein the set of instructions that are executable by at least one processor of the computing device to cause the computing device to further perform:
  determining an execution manner of the GEMM operation based on a size of the GEMM operation, available computation units among the multiple computation units, and computation capacities of the available computation units.

18. The computer readable medium of claim 16, wherein the set of instructions that are executable by at least one processor of the computing device to cause the computing device to further perform:
  determining an execution manner of the GEMM operation by running a software program.

19. The computer readable medium of claim 16, wherein the set of instructions that are executable by at least one processor of the computing device to cause the computing device to further perform:
  receiving, from the first local controller, an execution response of an instruction issued to the first local controller.

20. The computer readable medium of claim 19, wherein the execution response comprises an execution result of whether the execution has failed or succeeded and a reason of failure when the execution has failed.

21. The computer readable medium of claim 16, wherein at least one of the first local controller and the second local controller is a DMA (Dynamic Memory Access) unit on the accelerator.

22. A terminal, comprising:
  a host unit; and
  an accelerator for controlling execution of a GEMM (general matrix multiply) operation, the accelerator comprising:
    multiple computation units, a first memory device, and a second memory device;
    a global controller comprising circuitry configured to:
      determine an execution manner of the GEMM operation, the execution manner comprising partition information of the GEMM operation and computation unit allocation information of the partitioned GEMM operation,
      generate one or more instructions to compute the partitioned GEMM operation on one or more allocated computation units among the multiple computation units, and
      issue the one or more generated instructions;
    a plurality of local controllers including a first local controller and a second local controller, the first local controller being configured to control data movement between computation units and the first memory device and the second local controller being configured to control data movement between the first memory device and the second memory device; and
    a plurality of queues including a first queue and a second queue, wherein the global controller and the plurality of local controllers are coupled via the plurality of queues and wherein the one or more issued instructions are received by at least one of the first queue and the second queue to enable the at least one of the first local controller and the second local controller to execute the one or more instructions.

\* \* \* \* \*